(12) United States Patent
Buchholz et al.

(10) Patent No.: US 8,781,653 B2
(45) Date of Patent: Jul. 15, 2014

(54) QUIET LANDING ATTITUDE MODIFIER FOR AIRPLANE

(75) Inventors: Robert E. Buchholz, Lopez Island, WA (US); Monte R. Evans, Mill Creek, WA (US); Jonathan P. Lee, Everett, WA (US); Timothy G. Overton, Seattle, WA (US); Adam M. Thoreen, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 13/347,773

(22) Filed: Jan. 11, 2012

(65) Prior Publication Data

US 2013/0175392 A1 Jul. 11, 2013

(51) Int. Cl.
*B64C 9/00* (2006.01)
*G05D 1/08* (2006.01)

(52) U.S. Cl.
CPC .................. *G05D 1/08* (2013.01)
USPC ............ 701/16; 701/3; 701/5; 701/6; 701/18; 244/221; 244/183; 244/181

(58) Field of Classification Search
None
See application file for complete search history.

(56) References Cited

U.S. PATENT DOCUMENTS

| | | | | |
|---|---|---|---|---|
| 3,691,356 A | * | 9/1972 | Miller | 701/15 |
| 4,006,871 A | * | 2/1977 | Simpson | 244/186 |
| 4,042,197 A | * | 8/1977 | Boyle et al. | 244/183 |
| 4,093,159 A | * | 6/1978 | Gilson | 244/187 |
| 4,419,732 A | * | 12/1983 | Lambregts et al. | 701/16 |
| 4,633,404 A | * | 12/1986 | Greeson et al. | 701/3 |
| 5,036,469 A | * | 7/1991 | Pelton | 701/16 |
| 5,446,666 A | * | 8/1995 | Bauer | 701/4 |
| 5,823,479 A | * | 10/1998 | Nield et al. | 244/187 |
| 5,931,416 A | * | 8/1999 | Carpenter | 244/155 A |
| 6,325,333 B1 | * | 12/2001 | Najmabadi et al. | 244/181 |
| 6,422,517 B1 | * | 7/2002 | DeWitt et al. | 244/181 |
| 6,761,336 B2 | * | 7/2004 | DeWitt et al. | 244/181 |
| 7,690,603 B2 | * | 4/2010 | Peyrucain et al. | 244/183 |
| 7,896,293 B2 | * | 3/2011 | Boissenin et al. | 244/183 |
| 8,126,600 B2 | * | 2/2012 | Conner et al. | 701/16 |
| 8,180,503 B2 | * | 5/2012 | Estabrook et al. | 701/3 |
| 8,209,072 B2 | * | 6/2012 | Villaume et al. | 701/16 |
| 8,265,807 B2 | * | 9/2012 | Yamane et al. | 701/15 |
| 2013/0175392 A1 | * | 7/2013 | Buchholz et al. | 244/1 N |

OTHER PUBLICATIONS

"Use of Flaps" https://www.faasafety.gov/files/gslac/courses/content/35/376/Use%20of%20Flaps.pdf.*

* cited by examiner

*Primary Examiner* — Thomas Tarcza
*Assistant Examiner* — Richard Goldman
(74) *Attorney, Agent, or Firm* — Klintworth & Rozenblat IP LLC (57) ABSTRACT

The present invention provides a method of modifying the pitch attitude of an aircraft during landing, comprising: commanding the flaps to move to a landing setting; providing a current value for a flight condition parameter; providing a current flaps setting; comparing said current value to at least one threshold value; if said current value exceeds said threshold, determining a new flaps setting capable of producing an improvement in at least one of a selected aft body contact margin and a selected nose gear contact margin for the aircraft; and adjusting the flaps to said new flaps setting.

22 Claims, 6 Drawing Sheets

QUIET LANDING ATTITUDE MODIFIER FOR AIRPLANE

BACKGROUND OF THE DISCLOSURE

An airplane's pitch attitude is the angle defined by the longitudinal axis of the airplane and a horizontal line. Pitch attitude is an important airplane parameter that must be taken into consideration during landing approach and touchdown. Airplane pitch attitude during landing will vary according to a number of factors. For example, atmospheric disturbances, such as the presence of a wind gust, will affect pitch attitude, requiring adjustment. Pitch attitude adjustment in response to atmospheric disturbances ensures that the desired flight path angle will be maintained during landing.

Figures 1, 2:
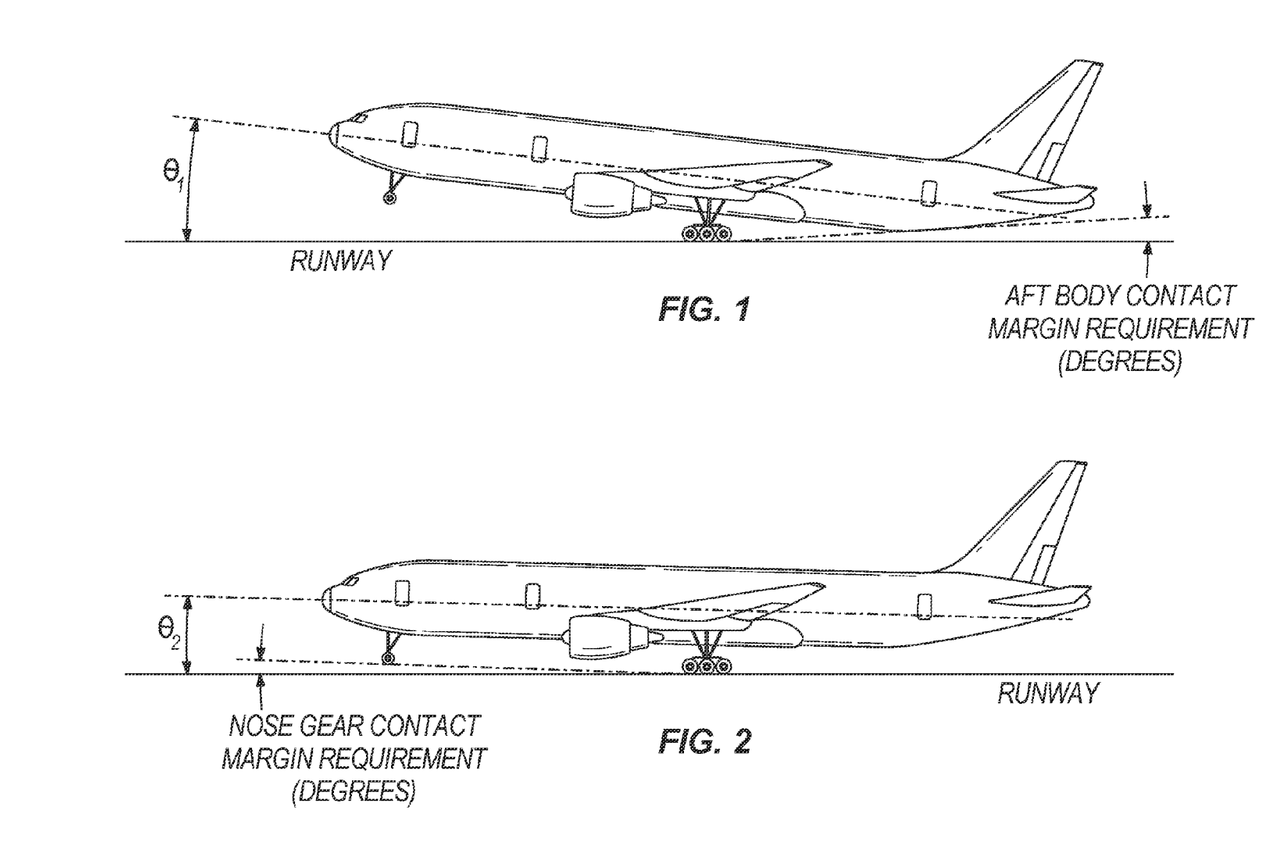
FIG. 1 illustrates the aft body contact margin requirement of an airplane.
FIG. 2 illustrates the nose gear contact margin requirement of an airplane.

During landing the pitch attitude envelope of an airplane is in part limited by the shape of the airplane. During landing flare and touchdown, as the nose of the airplane rises to increase pitch attitude, the aft section of the airplane becomes increasingly closer to the ground. The separation between the aft section of the airplane body and the ground is known as the aft body contact margin. To minimize the chance of the aft section from contacting the ground, it is desirable to not have the pitch attitude exceed a maximum value, commonly referred to as the most aft body critical flight condition. The most aft body critical flight condition defines a predetermined maximum pitch attitude that provides a required clearance between the aft section of the airplane body and the ground during landing. The required clearance is known as the aft body contact margin requirement. This requirement is in degrees and is defined by the angle between the runway and a line extending between the main landing gear of an airplane and the lowermost area of the aft section of the airplane. See FIG. 1.

In addition to a maximum value, during landing, it is also desirable that the pitch attitude not drop below a minimum value. During approach, the main landing gear and nose gear of an airplane are lowered. Because the nose gear is not designed to withstand the impact of airplane touchdown, it is crucial to land the airplane so that the main landing gear makes contact with the ground first. The separation between the nose gear and the ground when the main landing gear contacts the ground is known as the nose gear contact margin. In order to avoid nose gear first landings, a minimum pitch attitude, commonly referred to as a most nose gear critical flight condition, is defined. Landing at pitch attitudes equal to or greater than the minimum value for the most nose gear critical flight condition ensures that the main landing gear touchdown precedes the nose gear touchdown by a predetermined value. The predetermined value is known as the nose gear contact margin requirement. This requirement is also in degrees and is defined by the angle between the runway and a line extending between the main landing gear and the nose gear on the airplane. See FIG. 2.

As stated above, due to atmospheric conditions and other parameters, the pitch attitude of an airplane during landing will vary. Sometimes, the pitch attitude will increase to a large value, lowering the aft section of the airplane dangerously close to the ground during approach and touchdown. In some instances, the aft body contact margin requirement may be violated, causing the aft section of the airplane body to contact the ground, resulting in damage to the airplane.

These issues have been addressed by the landing attitude modifier (LAM) disclosed in U.S. Pat. No. 5,823,479. When the trailing flaps of an airplane are in a landing flap detent position, the LAM switches on and positions lift-generating surfaces, such as the flaperons, ailerons, or spoilers, to improve the nose gear contact margin and the aft body contact margin during an airplane's landing. As mentioned above, however, the LAM uses these devices with the trailing edge flaps in a landing detent position, so drag is increased during the approach segment of flight. Increased drag will increase airplane noise during approach in two ways. First, increased engine thrust will be needed to offset the drag increase. Increased engine thrust will increase approach noise. Secondly, increased drag is the result of an uneven lift distribution caused by flaperon deflections used to control attitude. The uneven distribution will cause approach noise generated by the airframe to increase.

The increased approach noise will cause an unfavorable environmental impact on communities surrounding the airport, and will also increase the Approach Noise certification level as defined by Federal Aviation Regulations, Part 36. Increased certified Approach Noise levels may restrict airplane operations at certain airports with an unfavorable impact.

A system and method is thus needed to overcome noise-related issues of the existing LAM systems and methods.

SUMMARY OF THE DISCLOSURE

These and other features, aspects and advantages of the disclosure will become better understood with reference to the following drawings, description and claims.

In one aspect, the present invention provides a method of modifying the pitch attitude of an aircraft during landing, comprising: commanding the flaps to move to a landing setting; providing a current value for a flight condition parameter; providing a current flaps setting; comparing said current value to at least one threshold value; if said current value exceeds said threshold, determining a new flaps setting capable of producing an improvement in at least one of a selected aft body contact margin and a selected nose gear contact margin for the aircraft; and adjusting the flaps to said new flaps setting.

In a second aspect, the present invention provides a method of reducing acoustic noise in a landing aircraft, comprising: providing a computer readable memory medium stored on the aircraft; and at least one processor operable to access from the computer readable memory medium program instructions executable by the processor to operate the aircraft flaps to modify the pitch attitude of the aircraft according to a current flight condition parameter, and operating the aircraft flaps according to the program instructions.

In a third aspect, the present invention provides a means of transportation comprising: an aircraft; a computer readable memory medium stored on the aircraft; and at least one processor operable to access from the computer readable memory medium program instructions executable by the processor to: operate the aircraft flaps to modify the pitch attitude of the aircraft according to a current flight condition parameter.

DEFINITIONS

As intended herein, the phrase "flaps N," where N is a natural number, denotes the angle of extension of an aircraft's flaps, also known as flaps setting or flaps position. Accordingly, "flaps 20" means that the flaps are extended to 20°, "flaps 23" that they are extended to 23°, and so forth. The higher the N, the higher the corresponding flaps setting. Similarly, phrases such as "moving to N" or "setting to N," when in reference to the flaps of an aircraft, are hereby meant to denote the act of extending, or retracting, the flaps to reach a setting of N degrees. In some instances, due to standardization among different aircraft, the phrase "flaps N" may no longer refer to the flaps being extended to exactly N degrees. However, those skilled in the art know exactly which flap angle and position correspond to a certain flap handle detent in a given aircraft.

As intended herein, the concept of a variable, such as an angle or a speed, exceeding a threshold is not to be restrictively read as applying only to instances whereby the variable increases to be larger than the threshold, but also those whereby the variable decreases to be lower than the threshold. For example, the airspeed of an aircraft exceeding a threshold V may both refer to the airspeed increasing to values larger than V or to it decreasing to values lower than V.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

The claimed invention provides a "QUIET LAM" ("QLAM") that accomplishes the landing attitude modification in a way that results in less acoustic noise for the surrounding community than traditional LAM. The QLAM does not rely on raising flaperons, spoilers, or ailerons for achieving landing attitude modification, but instead adjusts the position of the trailing edge flaps to keep the a flight condition parameter in a desirable range, and thereby keep pitch attitude in its desirable range. The QLAM function balances nose gear and tail margins for landing, while reducing as much as possible the noise heard in the surrounding community.

Using programming code stored on a computer readable medium, such as magnetic or optical disk, the QLAM carries out the function of operating the aircraft flaps to modify the pitch attitude of the aircraft according to the current values of a flight condition parameter. The flight condition parameter may be any parameter correlated with the aircraft's pitch attitude, such as the pitch attitude itself, the angle of attack, airspeed, or approach attitude. When the flaps are commanded to move to a landing position, the current value of the parameter is compared to threshold value(s) defining an acceptable range. If the value is found to exceed a threshold, the flaps are adjusted to a new setting capable of producing an improvement in at least one of a selected aft body contact margin and a selected nose gear contact margin for the aircraft.

In a first aspect of the invention, the flight condition parameter may be the angle of attack (also known as "alpha" or "AOA"), which, when the wings are level, is linked to the pitch attitude by equation (1):

$$\text{Pitch Attitude} = \text{Angle of Attack} + \text{Flight Path Angle} \quad (1)$$

Figure 3:
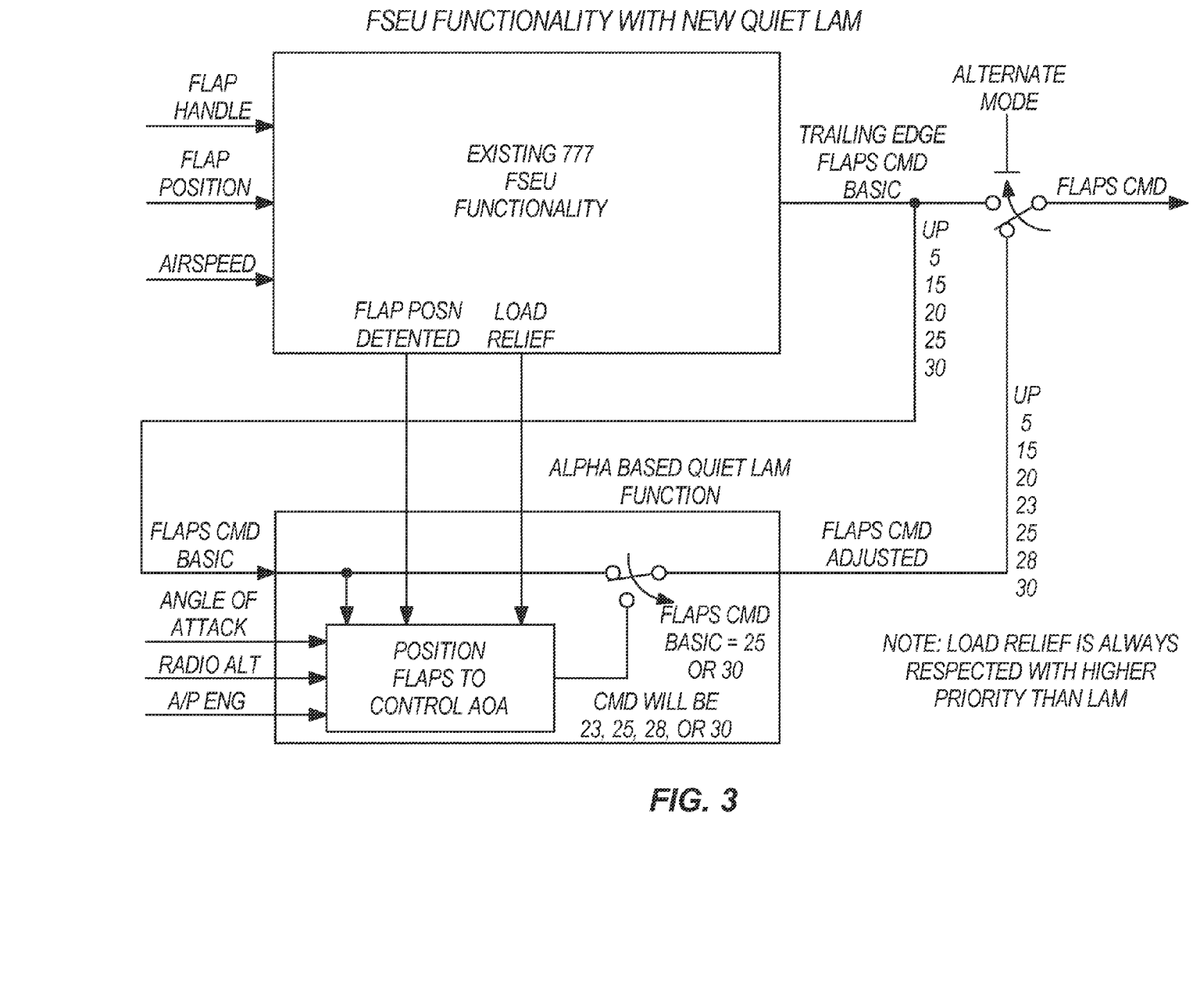
FIG. 3 illustrates an example of a traditional Flaps and Slats Electronic Unit (FSEU) provided with a QLAM.

FIG. 3 illustrates an example of a traditional Flaps and Slats Electronic Unit (FSEU) for a Boeing 777 provided with a QLAM having the angle of attack as flight function parameter ("AOA-QLAM," or "alpha-QLAM"), in accordance with the first aspect of the claimed invention. The alpha-QLAM does not operate as long as the flaps are set at 20° ("flaps 20") or less. When the flaps are commanded to move to landing positions, the FSEU produces an output to the QLAM. This requires a landing flaps detent of 25° or 30° for the Boeing 777, that is, a flaps command of 25 and 30 ("flaps 25" and "flaps 30," respectively). If the angle of attack exceeds selected threshold values, and other conditions such as a required altitude and the appropriate autopilot status are met, the alpha-QLAM adjusts the flaps among detented settings 23, 25, 28, and 30 in order to bring the angle of attack back to within the thresholds.

Figure 4:
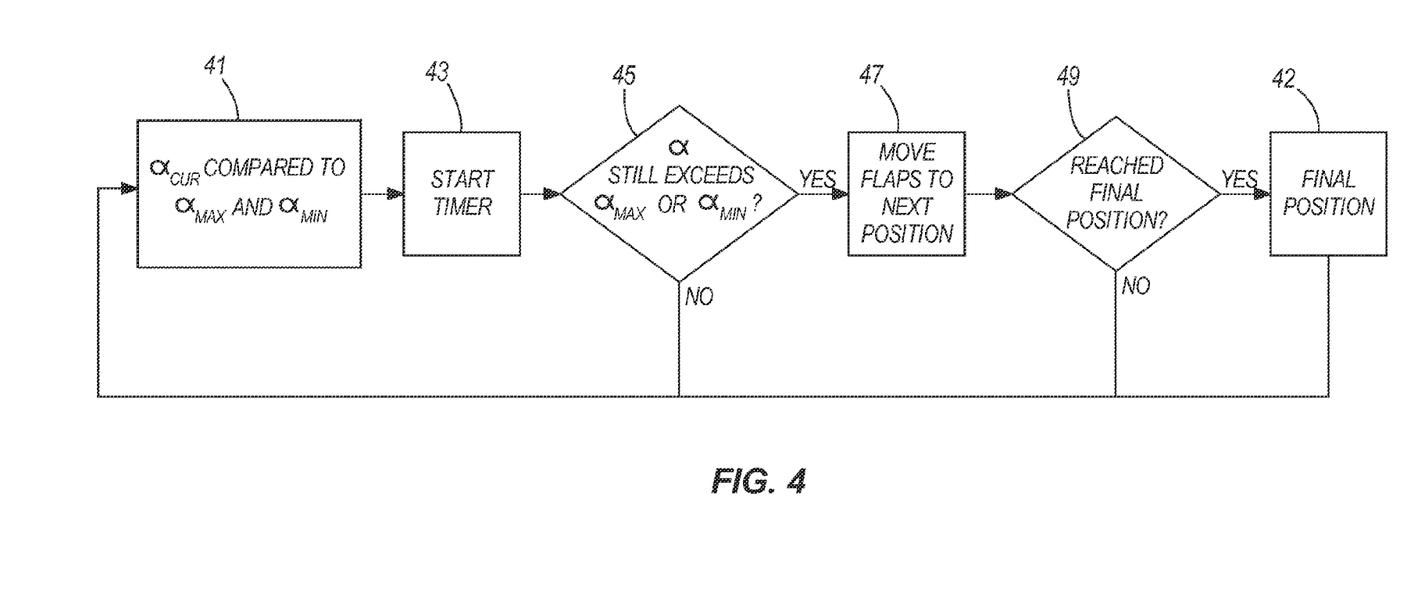
FIG. 4 is a flow diagram illustrating steps applied by an example alpha-QLAM.
Figure 4A:
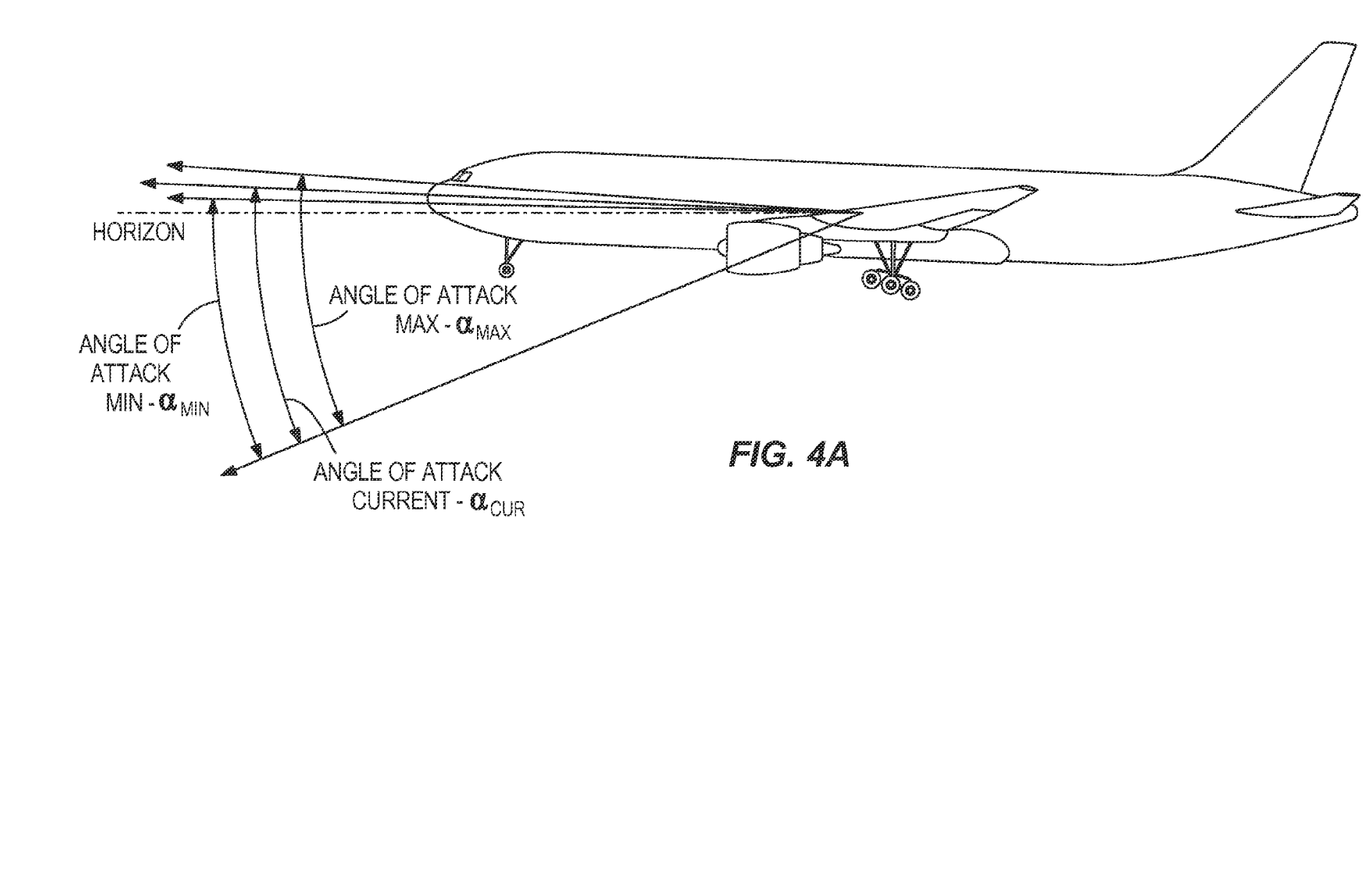
FIG. 4A illustrates the current angle of attack, maximum angle of attack, and minimum angle of attack for an aircraft.

FIG. 4 is a flow diagram illustrating steps applied by an example alpha-QLAM in accordance with the claimed invention. The current approach angle of attack $\alpha_{CUR}$, of the airplane is compared to upper threshold angle $\alpha_{MAX}$ and lower threshold angle $\alpha_{MIN}$ in comparison block 41. If $\alpha_{CUR}$ exceeds a threshold, a timer is started, as illustrated in block 43. If, when the timer finishes the angle of attack is still beyond the threshold (YES in decision block 45) then either "a too high" or "a too low" is set true, and a command is issued to the flaps to move to the next position (block 47). The flaps are then extended to the next higher detented position if the angle of attack is above the upper threshold, or retracted to the next lower detented position if the angle of attack is below the lower threshold.

When the above command to the flaps is issued, it is isolated from change for a brief time (e.g. 3 seconds) to allow the flap drive system to move the flaps away from the current position. While the flaps move to a new position, the flap command is not subjected to change due to angle of attack changes. After the flaps have arrived at the newly commanded position, and remained there for a brief lag time, e.g. 2.5 seconds, the current approach angle of attack $\alpha_{CUR}$ is again compared to threshold values $\alpha_{MAX}$ and $\alpha_{MIN}$.

If the angle of attack remains outside the desired range, a new command is issued to further move the flaps to a next position, that is to again extend or retract depending on which threshold is violated. Eventually, either the angle of attack will return from beyond the threshold, or the flaps will be commanded to one final position or the other (YES in decision block 49). In the Boeing 777, such final positions are flaps 30 for extension, flaps 23 for retraction in manual, and flaps 25 for retraction in autopilot operation. If, after a flaps change is accomplished, the angle of attack returns to the desired range, then no further flaps command is issued until the angle of attack again crosses a threshold.

Figure 5:
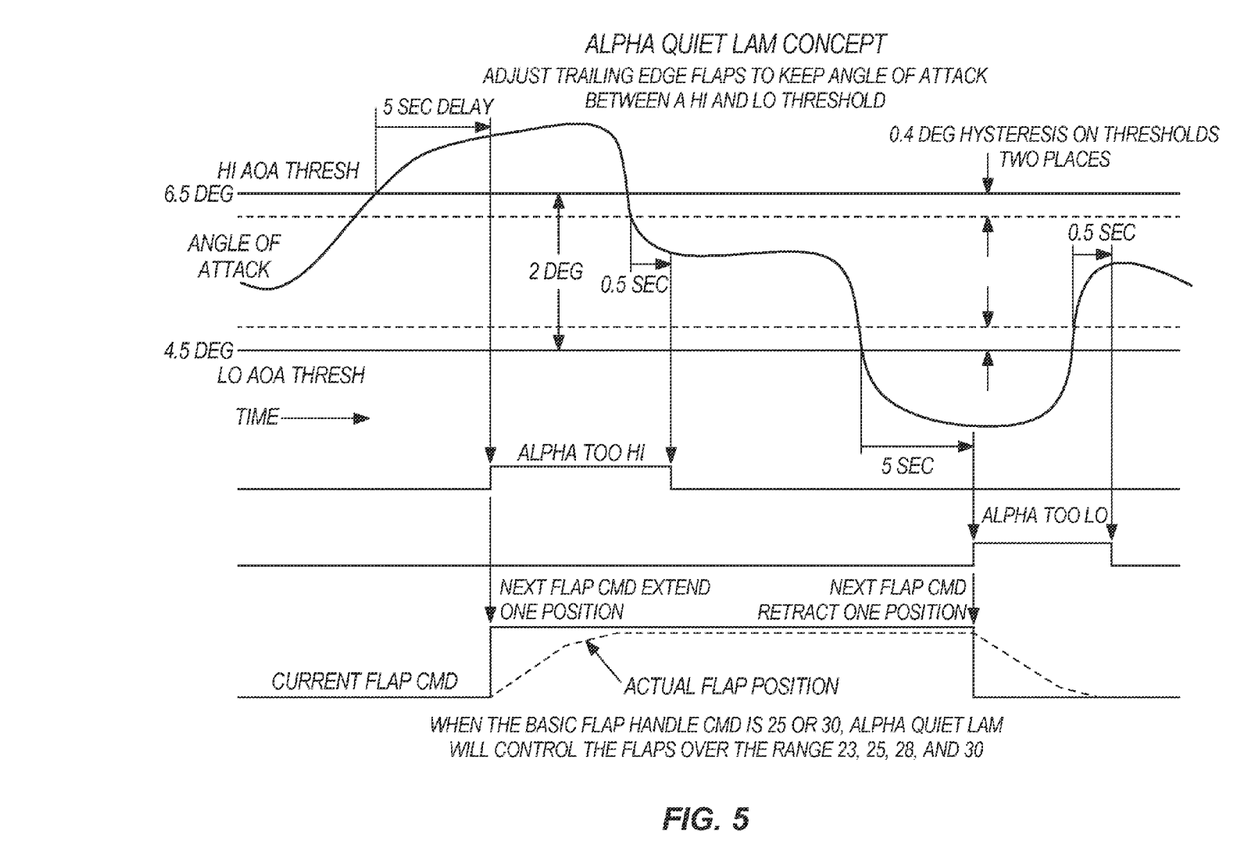
FIG. 5 illustrates an example alpha-QLAM in operation.

In the Boeing 777, $\alpha_{MAX}$ is preferably 6.5 degrees, and $\alpha_{MIN}$ is preferably 4.5 degrees, so that the pitch attitude is kept between 1.5 degrees and 3.5 degrees. As illustrated in the example of FIG. 5, the $\alpha_{MAX}$ and $\alpha_{MIN}$ thresholds are preferably implemented with a small amount of hysteresis, for example 0.4 degrees. Accordingly, if a $\alpha_{MAX}$ of 6.5 degrees is exceeded, and "α too high" is set true, then the angle of attack must decrease below 6.1 before "α too high" is returned to false. Similarly, if the angle of attack drops below 4.5 degrees, it must rise above 4.9 degrees before "α too low" is returned to false. This hysteresis is applied mainly to avoid leaving the trim angle of attack too near a threshold. In addition, to avoid too much activity in turbulence, the angle of attack signal is preferably passed through a lag filter, for example a 0.5 seconds lag filter, to smooth out some of the high frequency content, and reduce switching activity. One of ordinary skill in the art will understand that in other aircraft other threshold angle of attack values may apply, depending on the specific characteristics of the aircraft at hand.

Figure 6:
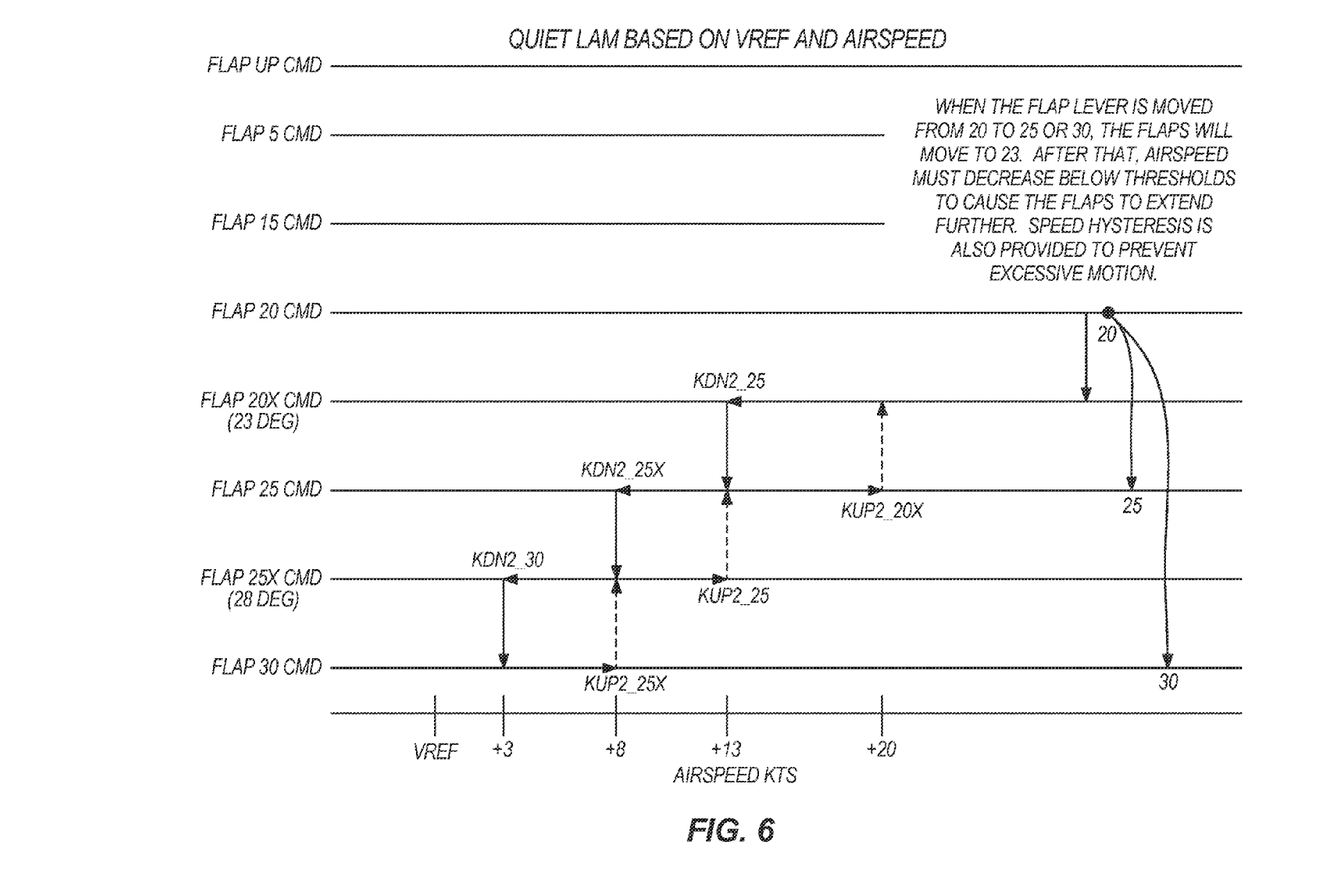
FIG. 6 illustrates an example speed-QLAM.

FIG. 6 illustrates an example speed-QLAM, an alternative QLAM having the current airspeed V of the aircraft as flight condition parameter, according to a second aspect of the invention. The speed-QLAM does not operate as long as the flaps are set at 20° ("flaps 20") or less. When the flaps are commanded to move to landing settings, the FSEU produces an output to the speed-QLAM. As set forth above for the alpha-QLAM, this requires a landing flaps detent of 25° or 30° for the Boeing 777. At this point, although the flap lever has been set to one of the landing settings 25 or 30, the QLAM will command the flaps to instead move to a setting lower than the landing settings, in this instance to a landing flap detent of 23°.

A number of airspeed threshold values, each exceeding a reference speed $V_{REF}$ by a set amount, are set. Also illustrated in FIG. 6, for the Boeing 777 preferred airspeed threshold values are set at 3, 8, 13, and 20 and 23 knots above $V_{REF}$, but different thresholds may be established for different aircraft by setting amounts of airspeed in excess of $V_{REF}$ that best suit the aircraft at hand. If the current airspeed V increases or decreases so as to reach one such threshold, and other conditions such as a required altitude and the appropriate autopilot status are met, the speed-QLAM adjusts the flaps to new settings accordingly. For example, and again as shown in FIG. 6, if the current airspeed V decreases until the threshold speed of 13 knots above $V_{REF}$ is reached, the flaps are further extended to 25.

Once the flaps have been extended to this new setting, V is again compared to $V_{REF}$. If it is found to have further decreased below the threshold speed of 8 knots above $V_{REF}$, a new command is issued to further extend the flaps to 28. Conversely, if the airspeed V has risen above the threshold of 20 knots above $V_{REF}$, the flaps are commanded to retract back to 23. If the airspeed V remains outside the allowed range for a given flaps setting, a new command is issued to further move the flaps to a next position, that is to again extend or retract depending on which threshold is violated. Eventually, either the airspeed will return from beyond the threshold, or the flaps will be commanded to one final position or the other. As set forth above, such final positions are flaps 30 for extension, flaps 23 for retraction in manual, and flaps 25 for retraction in autopilot operation for the Boeing 777. If, after a flaps change is accomplished, the airspeed remains within the range allowed for the new flaps setting, then no further flaps command is issued until the airspeed crosses a threshold.

Regardless of the type of QLAM function employed, care should be taken to keep the QLAM responsive to pilot inputs through the flap handle. Timers in the logic must be positioned such that if the pilot changes the flap handle position, he or she does not have to wait for any timer to finish before the system reacts to the new basic command. Rather, the reaction must happen immediately. Accordingly, moving the handle from 30 to 25, with the flaps at 28 or 30, immediately results in a command to go to 25. However, if the QLAM flaps command in that case had been 23, it would have remained at 23.

Moreover, at no time is the adjusted flaps command greater than the basic flaps command. For example, if the pilot gives the command to set the flaps at 25° ("flaps 25") the alpha-QLAM function is not allowed to set the flaps at 28° ("flaps 28") or 30° ("flaps 30"). In addition, the adjusted flaps command should never be greater than the basic flap command given by the pilot. Accordingly, if the flaps handle is placed in flaps 25, the QLAM function is not allowed to command flaps 28 or flaps 30. Moreover, a load relief command is always respected with higher priority than the QLAM. Thus, if the FSEU identifies a load relief condition and issues a command to perform a load relief retraction, at no time would the QLAM function deny or delay this load relief command. Rather, it must respond immediately to the load relief command.

Preferably, if the autopilot is engaged, the use of the flap 23 position is denied to the QLAM, and only manually flown landings are allowed to retract flaps to 23 to control the angle of attack, and thereby pitch attitude, to the desired range. When the pilot moves the flap handle beyond flaps 20, the flaps must wait for the leading edge to extend, and then immediately move to flaps 23. The QLAM should not be allowed to retract the flaps to 20. Instead, movement of the handle commanding the flaps to 25 or 30 must always produce at least a flap change of position to 23.

When landing, for example upon descent below a threshold radio altitude of 80 ft, further QLAM adjustments are prevented, i.e. the flaps are frozen until, after landing, the flap handle is moved, at which time the QLAM is disarmed, and the flaps follow the basic command, as controlled by the flap handle. At anytime, if the handle commanding the flaps is moved from 25 or 30 to position 20 or less, the QLAM immediately disengages, and the basic flaps command is used.

The flaps settings and thresholds values referred to in the foregoing all apply to the Boeing 777. One of ordinary skill in the art will readily appreciate that other types of aircraft may have different flap settings or different threshold values, but the QLAM of the invention can be easily tailored to the aircraft at hand by means of changes to suit the characteristics of the aircraft without departing from the spirit and scope of the invention as claimed.

It should also be understood, of course, that the foregoing relates to exemplary aspects and embodiments of the disclosure and those modifications may be made without departing from the spirit and scope of the disclosure as set forth in the following claims.

We claim:

1. A method of modifying a pitch attitude of an aircraft during landing comprising:
   commanding trailing edge flaps to move to a landing setting;
   providing a current value for a flight condition parameter;
   providing a current trailing edge flaps setting;
   comparing said current value of the flight condition parameter to a plurality of thresholds having an acceptable range between said plurality of thresholds; and
   if said current value of the flight condition parameter is outside the acceptable range:
   (1) adjusting the trailing edge flaps to a new flaps setting;
   (2) keeping the trailing edge flaps in the new flaps setting for a predetermined time period; and
   (3) after the predetermined time period if said current value of the flight condition parameter is outside the acceptable range and the trailing edge flaps are not in final trailing edge flap positions then repeating (1), (2), and (3) until the current value of the flight condition parameter is within the acceptable range or the trailing edge flaps are in the final trailing edge flap positions.

2. The method of claim 1, wherein said flight condition parameter is a current approach angle of attack $\alpha_{CUR}$.

3. The method of claim 2, wherein said plurality of thresholds comprise an upper threshold angle $\alpha_{MAX}$ and a lower threshold angle $\alpha_{MIN}$.

4. The method of claim 3, wherein if $\alpha_{CUR}$ is greater than $\alpha_{MAX}$ the new flaps setting is adjusted higher so that the trailing edge flaps are extended away from wings of the aircraft.

5. The method of claim 3, wherein if $\alpha_{CUR}$ is less than $\alpha_{MIN}$ the new flaps setting is adjusted lower so that the trailing edge flaps are retracted towards the wings of the aircraft.

6. The method of claim 3, wherein $\alpha_{MAX}$ is 6.5 degrees.

7. The method of claim 3, wherein $\alpha_{min}$ is 4.5 degrees.

8. The method of claim 1, wherein said flight condition parameter is a current airspeed V.

9. The method of claim 8, wherein said plurality of thresholds comprise a first threshold which comprises a first airspeed which is above a reference speed $V_{REF}$ by a first amount and a second threshold which comprises a second airspeed which is above the reference speed $V_{REF}$ by a second amount which is less than the first amount.

10. The method of claim 9, wherein if the current airspeed V is below the second threshold the new flaps setting is adjusted higher so that the trailing edge flaps are extended away from wings of the aircraft.

11. The method of claim 9, wherein if the current airspeed V is above the first threshold the new flaps setting is adjusted lower so that the trailing edge flaps are retracted towards the wings of the aircraft.

12. The method of claim 9, wherein the plurality of thresholds comprise 3, 8, 13, and 20, knots above $V_{REF}$.

13. The method of claim 1 wherein the acceptable range applies a hysteresis to each of the plurality of the thresholds.

14. The method of claim 13 wherein the hysteresis applied to each of the plurality of the thresholds is 0.4 degrees.

15. A method of reducing acoustic noise during a landing of an aircraft comprising:
providing a computer readable memory medium, at least one processor, and program instructions stored by the computer readable memory medium;
executing the program instructions with the at least one processor to modify a pitch attitude of the aircraft during landing by:
commanding trailing edge flaps to move to a landing setting;
providing a current value for a flight condition parameter;
providing a current trailing edge flaps setting;
comparing said current value of the flight condition parameter to a plurality of thresholds having an acceptable range between said plurality of thresholds; and
if said current value of the flight condition parameter is outside the acceptable range:
(1) adjusting the trailing edge flaps to a new flaps setting;
(2) keeping the trailing edge flaps in the new flaps setting for a predetermined time period; and
(3) after the predetermined time period if said current value of the flight condition parameter is outside the acceptable range and the trailing edge flaps are not in final trailing edge flap positions then repeating (1), (2), and (3) until the current value of the flight condition parameter is within the acceptable range or the trailing edge flaps are in the final trailing edge flap positions.

16. The method of claim 15, wherein said flight condition parameter is a current approach angle of attack $\alpha_{CUR}$.

17. The method of claim 15, wherein said flight condition parameter is a current aircraft airspeed V.

18. The method of claim 15 further comprising the program instructions causing the at least one processor to apply a hysteresis to each of the plurality of the thresholds to obtain the acceptable range.

19. A means of transportation comprising:
an aircraft;
a computer readable memory medium stored on the aircraft;
program instructions stored by the computer readable memory medium; and
at least one processor configured to execute the program instructions to modify a pitch attitude of the aircraft during landing;
wherein the program instructions are configured to: command trailing edge flaps to move to a landing setting; provide a current value for a flight condition parameter; provide a current trailing edge flaps setting; compare said current value of the flight condition parameter to a plurality of thresholds having an acceptable range between said plurality of thresholds; and if said current value of the flight condition parameter is outside the acceptable range then: (1) adjust the trailing edge flaps to a new flaps setting; (2) keep the trailing edge flaps in the new flaps setting for a predetermined time period; and (3) after the predetermined time period if said current value of the flight condition parameter is outside the acceptable range and the trailing edge flaps are not in final trailing edge flap positions then repeat (1), (2), and (3) until the current value of the flight condition parameter is within the acceptable range or the trailing edge flaps are in the final trailing edge flap positions.

20. The means of transportation of claim 19, wherein said flight condition parameter is a current approach angle of attack $\alpha_{CUR}$.

21. The means of transportation of claim 19, wherein said flight condition parameter is a current aircraft airspeed V.

22. The means of transportation of claim 19, wherein the program instructions are further configured to apply a hysteresis to each of the plurality of the thresholds to obtain the acceptable range.

* * * * *